Patented Apr. 17, 1928.

1,666,312

UNITED STATES PATENT OFFICE.

WILLIAM B. RUNYAN, OF DAYTON, OHIO.

METALLURGICAL BRIQUETTE AND PROCESS OF USING IT.

No Drawing.    Application filed March 31, 1921.    Serial No. 457,567.

My present invention relates to an improved composition of matter and to a metallurgical process of using it. More particularly my invention relates to a briquetted mixture suitable for use in iron furnaces for several purposes.

My invention consists primarily in a mixture of carbonaceous material, lime and sand in the form of a briquette.

One purpose of this composition is to provide carbon in such a condition that it can be quickly taken up by molten iron when the briquette is thrown on a bath of molten iron.

Another purpose is to provide a suitable mixture of slag materials together with a reducing agent all together in briquette form.

A further purpose is to incorporate metallic reducing agents or alloy metals in this briquette, to aid in deoxidizing and to assist in absorption of the carbon and in making the briquette heavy so that it will extend down into the metal so as to get intimate contact with the metal.

One feature of my invention consists in using slacked lime or hydrated lime as a binder for the sand, carbon and other material of the briquette, and the briquette may either be pressed in a press or cast in a mold.

In the metallurgical treatment of iron, particularly in melting in combustion furnaces to prepare iron for making castings, for example white iron for malleable castings, or for making gray iron it may be necessary to add carbon or silicon or manganese to the metal; and owing to oxidizing influences present in the gases and slag, there usually results a considerable loss of some of these elements and iron, either in slag or the carbon being oxidized and going off as gas. It is difficult to get molten iron to take up fine carbon thrown on the clear surface of the metal in an air or combustion furnace or open-hearth furnace because of the loss of carbon in the furnace draft, and other reasons. The carbon may become largely oxidized by the oxygen in the gas before the iron can dissolve it. Furthermore the presence of oxide in the slag hinders the taking up of carbon by the metal. My present invention has for one object the overcoming of such difficulties by combining the carbon and deoxidizing metal and slag materials in a briquette which is heavy enough to extend into the bath of iron and which is not easily blown off by the furnace draft, and which combines the essential conditions necessary for making the iron dissolve the carbon quickly.

I have found that a briquette comprising lime and sand and carbon and ferromanganese acts very quickly and efficiently for the purposes above mentioned.

I may make such a briquette in the following way: Carbon in the form of ground coke or carbon deposit from oil tanks is mixed with hydrated lime and a good silicon sand, the proportions may be about three of carbon to one of lime and one of sand. This mixture may be briquetted by pressing in a press, or it may be cast more or less like mortar using the lime as binder with the sand.

I may incorporate in the above mixture spiegel iron or ferromanganese in suitable proportion to aid in deoxidizing and give weight to the briquette and, if desired, incorporate manganese in the bath this way. The proportion of such alloy metal depends on how much of it is desired in the metal.

I may incorporate silicon or metallic manganese in the briquette instead of using an alloy containing such metal or metals. I may incorporate silicon in the briquette as ferrosilicon or as other alloy of silicon.

The proportions of carbon may be varied according to the amount desired. My briquette forms a very simple way of providing the reducing agent together with slag making materials. I have found its use very advantageous in treating iron in a combustion furnace to carburize the iron, for example, enough briquettes may be thrown on a bath of iron in a combustion furnace to provide approximately 10 pounds of carbon in the briquette per ton of iron. I usually clear the surface of the bath of oxidized slag before doing this and then the briquette breaks up and forms a slag of proper composition which aids in deoxidizing the iron and in letting the iron dissolve the carbon. A large percentage of the carbon may in this way be taken up by the iron.

One advantage of the use of material in briquetted form is that the draft does not so rapidly burn it and does not carry it away readily. It dips down into the metal and causes quick action thereon. It is also easy to handle and contains known amounts of materials forming a very simple way of making furnace additions merely by counting the number of briquettes.

I may make the briquette in a suitable form but prefer a form somewhat the shape of a brick as the most efficient shape and form.

What I claim is:

1. A briquette free from an admixture of metallic ore comprising ground coke, a silicon sand and lime, the sand and lime being present in about equal parts and in sufficient quantities to hold the carbonaceous matter together.

2. A briquette free from an admixture of metallic ore comprising coke, lime and sand and a metallic alloy, such as ferromanganese in fine form.

3. The process of making a briquette free from an admixture of metallic ore containing carbonaceous material for metallurgical furnace use, said process consisting in mixing a carbonaceous material with lime and sand as binder.

In testimony whereof I have signed my name to this specification on this 29th day of March, A. D. 1921.

WILLIAM B. RUNYAN.